Sept. 25, 1945.  J. K. SIMPSON  2,385,545
HYDRAULIC VIBRATION DAMPER
Filed Jan. 27, 1943
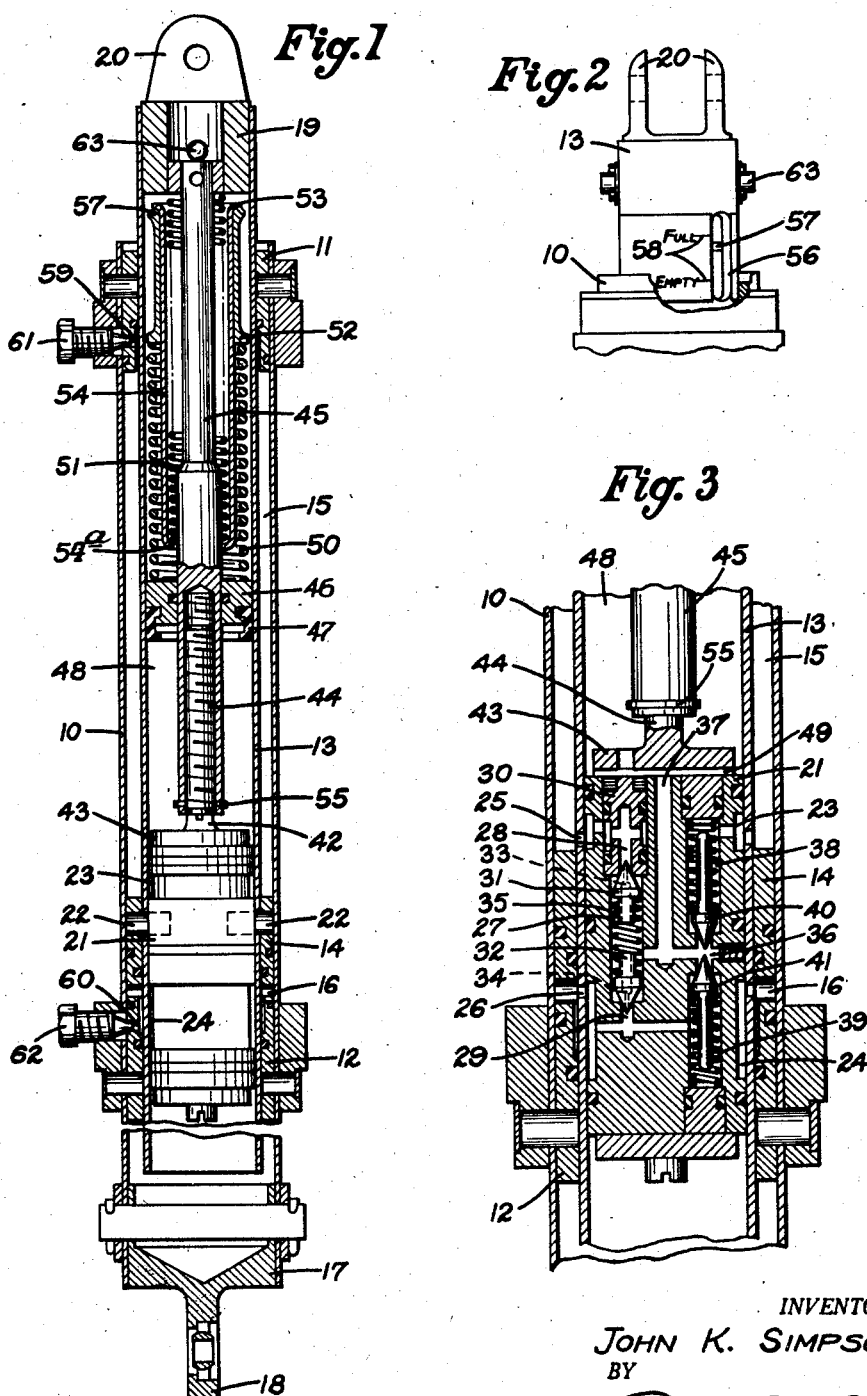
INVENTOR.
JOHN K. SIMPSON
BY
M. W. McConkey Patented Sept. 25, 1945

2,385,545

UNITED STATES PATENT OFFICE 2,385,545

HYDRAULIC VIBRATION DAMPER

John Keith Simpson, Leamington Spa, England, assignor to Automotive Products Company Limited, Leamington Spa, Warwick, England Application January 27, 1943, Serial No. 473,766
In Great Britain February 16, 1942

13 Claims. (Cl. 188—96)

This invention relates to hydraulic vibration dampers, more particularly for use on aircraft, where they are employed to restrain the vibration of control surfaces due to the action of the relative air flow.

The object of the invention is to provide a compact vibration damper having improved means for storing reserve liquid.

According to the invention, a hydraulic vibration damper comprising a piston-and-cylinder unit with means for permitting a restricted flow of liquid past the piston is characterised by the feature that the piston is mounted on a rod at least a part of which is hollow and forms a reservoir for liquid, means being provided in the reservoir for maintaining the liquid under pressure.

According to another aspect of the invention, a hydraulic vibration damper comprises a cylinder with a tubular piston rod extending therethrough, an annular piston head on said piston rod dividing the cylinder into two chambers, a valve block in the tubular piston rod forming one end of a reservoir chamber in said piston rod, means for exerting pressure on the liquid in said reservoir chamber, a passage in the valve block connecting each of the two cylinder chambers to the reservoir chamber, restricting means in the said passages, and additional passages bypassing the restrictions, the said additional passages being provided with non-return valves permitting substantially free flow of liquid into said cylinder chambers.

A spring loaded piston is preferably provided in the reservoir for exerting pressure on the liquid therein, and may be associated with an indicator device visible externally of the vibration damper for indicating the position of the floating piston.

The piston may be loaded by two springs in series, the indicator device being mounted between the two springs and having a movement different from, but proportional to, that of the piston. The springs preferably have equal rates so that the movement of the indicator for any given movement of the piston is equal to one half of the said piston movement. The spring-loaded piston may surround a stem projecting inwardly from an end closure member for the hollow piston rod, and the two springs may surround the stem, one being disposed within the other, the springs engaging respectively with inturned and out-turned flanges at opposite ends of a sleeve arranged between them. The stem may be adapted for screw-threaded engagement with a second stem projecting from the valve block.

The restricted passages from the two cylinder chambers may lead into a common passage connected directly to the reservoir and through two non-return valves to substantially unrestricted passages leading to the respective cylinder chambers. The restricted passages may be formed in valve members which are adapted to be unseated by excessive pressure to permit liquid to by-pass the restrictions.

The invention is hereinafter described with reference to the accompanying drawing, in which—

Figure 1 is a sectional elevation of a hydraulic vibration damper according to the invention, certain parts being shown in elevation;

Figure 2 is a fragmentary elevation of one end of the damper shown in Figure 1; and Figure 3 is a section, on an enlarged scale, through the valve block and adjacent parts.

Referring to the drawing, the cylinder of the damper comprises a tube 10 having an annular internal head 11 at one end, and a second similar head 12 at some distance from its other end. A tubular piston rod 13 is slidable through the heads 11 and 12, and carries an annular head 14 dividing the cylinder into two chambers 15 and 16. The usual packings are provided on the piston and cylinder heads to render the chambers 15 and 16 fluid-tight. The tube 10 extends beyond the head 12 to a sufficient length to accommodate the piston rod 13 when the piston head 14 is adjacent the cylinder head 12, as shown on the drawing, and is fitted with an end closure 17 formed with an eye 18 for attachment to any convenient mounting. A closure head 19 at the opposite end of the piston rod is formed with a clevis 20 for attachment purposes. Mounted within the piston rod 13 so that it is surrounded by the piston head 14 is a valve block 21, the head 14 and block 21 being positioned in the tubular rod 13 by pins 22 (Figure 1). Two annular grooves 23 and 24 formed in the block 21 are connected by ports 25 and 26 respectively to the cylinder chambers 15 and 16, and packing rings are provided on each side of the grooves. In the valve block 21 there is formed a cylindrical chamber 27, into opposite ends of which lead concentric passages 28 and 29, the former in a plug 30 closing one end of the chamber, and the latter in the block itself. The passages 28 and 29 are connected respectively to the annular grooves 23 and 24. Two valve members 31 and 32 with conical heads seat in the ends of the passages 28 and 29, the valve members being drilled through to form fine-bore orifices 33 and 34 leading from the passages into the chamber 27. A spring 35 between the valve members holds them on their seats. A passage 36 leading from the chamber 27 intersects a passage 37 opening at one end of the valve block, and also intersects a further passage leading to two chambers 38 and 39 connected respectively to the annular grooves 23 and 24, and accommodating non-return valves 40 and 41.

To the end of the valve block 21 at which the passage 37 opens is secured, as by screws, one of which is shown at 42 (Figure 1), a disc 43 from which extends a screwed stem 44. Extending from the end closure 19 of the piston rod is another stem 45 which is hollow at its inner end and is internally screw-threaded to engage the stem 44. Sliding in a fluid-tight manner on the stem 45 is a piston 46 having a sealing member 47 engaging the wall of the cylinder so as to define a reservoir space 48 between itself and the valve block 21, to which space the passage 37 in the valve block is connected by a diametral groove 49 across the inner face of the disc 43. The piston 46 is urged towards the valve block by a group of springs comprising an outer spring 50 and an inner spring 51, the former extending between the piston 46 and an abutment 52 positioned by an out-turned flange 53 at one end of a sleeve 54 arranged between the springs, whilst the latter extends between an inturned flange 54a at the other end of the sleeve 54 and the end closure 19. The springs are thus arranged in series and the spring 51 has a rate equal to that of the spring 50 so that any movement of the piston 46 is accompanied by a movement of the sleeve 54 equal to half the movement of the piston. Movement of the piston 46 towards the inner end of the stem 45 (that is towards the valve block 21 when the unit is assembled) is limited by a spring ring 55, so that the end closure 19, springs 50 and 51, and piston 46 can be removed as a unit. The end of the piston rod 13 which projects through the cylinder head 11 is formed with a slot 56 (Figure 2) through which is visible the edge 57 of a collar on the spring abutment 52, thus giving a visible indication of the position of the piston 46. Markings 58 on the exterior of the rod 13 indicate extreme positions of the piston 46.

Vents 59 and 60 are provided in the cylinder heads 11 and 12, the vents being closed by screw plugs 61 and 62.

The damper unit is filled with liquid in the following manner. It is first of all supported vertically, the unit comprising the end closure 19 together with the piston 46 and springs 50, 51 is removed, and liquid is poured in. The vent screws 61 and 62 are then removed, and the piston 46 is re-inserted in the piston rod, and forced inwardly until the stem 44 enters the hollow end of the stem 45 and the screw threads are engaged. Liquid is thus forced through the cylinder chambers 15 and 16, and out through the vents 59 and 60, carrying with it any air which was in the unit. The vent 60 is closed as soon as liquid begins to appear, and the remaining air is forced out through the upper vent 59.

When the stems 44 and 45 are engaged, the vent 59 is closed, and the stem 45 is screwed down to load the springs 50 and 51 until the end closure 19 enters the end of the piston rod 13 and a transverse locking pin 63 can be inserted. The travel of the stem 45 from its initial engagement with the stem 44 until the closure 19 reaches the position in which the pin 63 can be inserted is calculated to give a predetermined loading of the springs 50, 51 and to bring the indicator 57 substantially opposite the "full" mark on the piston rod. Any increase or decrease of temperature in the vicinity of the damper unit will vary the volume of the liquid therein, and this is compensated for by such liquid flowing into or out of the reservoir chamber 48, thus keeping the cylinder chambers 15 and 16 always full, and at a pressure determined by the loading of the springs 50, 51. Any leakage from the unit causes the piston 46 to approach the valve block 21, this movement being shown by the indicator 57, until the latter reaches the "empty" mark, which is so placed that, with the indicator on this mark at a given mean temperature, the piston 46 has only just sufficient free movement to maintain pressure in the unit at some selected low temperature chosen according to the conditions in which the unit is intended to be used.

The operation of the damper is as follows. The damper is normally connected between a unit, such as a wing flap whose movement is to be controlled, and a fixed point on the aircraft, so that it is extended or shortened by movement of the control surface. Any such movement displaces liquid from one of the cylinder chambers 15 or 16 and this liquid has to pass through a restricted passage 33 or 34 to escape from the chamber, so that only gradual movement can take place. Liquid flows freely into the other cylinder chamber through the non-return valve 40 or 41. The valve members 31 and 32 in which the restricted passages 33 and 34 are formed are held on their seats by the spring 35, which permits them to lift only if a predetermined high pressure, due to an exceptional load on the control surface, is encountered, thus removing the risk of damage to the control surface or damper unit if such exceptional load were resisted.

The damper unit thus resists the rapid oscillatory movements of a control surface which are likely to be set up due to the relative air flow, but permits a steady gradual movement such as is effected by operation of the aircraft controls.

It will be understood that although the hydraulic damper has been described as applied to control surfaces of aircraft, it may be used in any position in which rapid oscillatory movements or vibrations are to be prevented whilst steady controlled movements are to be permitted.

The relative movements of the piston 46 and indicator 57 may be modified by using springs of different rates on opposite sides of the indicator member.

What I claim is:

1. A hydraulic vibration damper comprising a cylinder with a tubular piston rod extending therethrough, an annular piston head on said piston rod dividing the cylinder into two chambers, a valve block in the tubular piston rod forming one end of a reservoir chamber in said piston rod, means for exerting pressure on the liquid in said reservoir chamber, a passage in the valve block connecting each of the two cylinder chambers to the reservoir chamber, restricting means in the said passages, and additional passages by-passing the restrictions, the said additional passages being provided with non-return valves permitting substantially free flow of liquid into said cylinder chambers.

2. A hydraulic vibration damper according to claim 1, wherein the restricted passages from the two cylinder chambers lead into a common passage connected directly to the reservoir and through two non-return valves to substantially unrestricted passages leading to the respective cylinder chambers.

3. A hydraulic vibration damper according to claim 1, wherein the restricted passages from the two cylinder chambers lead into a common passage connected directly to the reservoir and through two non-return valves to substantially unrestricted passages leading to the respective cylinder chambers, the restricted passages being formed in valve members which are adapted to be unseated by excessive pressure to permit liquid to by-pass the restrictions.

4. A hydraulic vibration damper comprising a piston-and-cylinder unit having means for permitting a restricted flow of liquid past the piston, said piston being mounted on a rod at least a part of which is hollow and forms a reservoir for liquid, means comprising a spring-loaded piston in the reservoir for maintaining the liquid therein under pressure, said piston being loaded by two springs in series, and an indicator device mounted between the two springs and having a movement different from, but proportional to, that of the piston.

5. A hydraulic vibration damper according to claim 4, wherein the springs which load the piston have equal rates so that the movement of the indicator for any given movement of the piston is equal to one-half of the said piston movement.

6. A hydraulic vibration damper according to claim 4, wherein the spring-loaded piston surrounds a stem projecting inwardly from an end closure member for the hollow piston rod.

7. A hydraulic vibration damper according to claim 4, wherein the two springs are arranged to surround a stem projecting inwardly from an end closure member for the hollow piston rod, one being disposed within the other, and engage respectively with inturned and out-turned flanges at opposite ends of a sleeve arranged between them.

8. A hydraulic vibration damper according to claim 4, wherein the two springs are arranged to surround the stem projecting inwardly from an end closure member for the hollow piston rod, one being disposed within the other, and engage respectively with inturned and out-turned flanges at opposite ends of a sleeve arranged between them, said sleeve being provided with a collar forming the indicator.

9. A hydraulic vibration damper according to claim 4, wherein the spring-loaded piston surrounds a stem projecting inwardly from an end closure member for the hollow piston rod, and said stem is adapted for screw-threaded engagement with a second stem projecting from the valve block at the other end of the hollow piston rod.

10. A hydraulic vibration damper according to claim 4, wherein the spring-loaded piston surrounds a stem projecting inwardly from an end closure member for the hollow piston rod, and said stem is adapted for screw-threaded engagement with a second stem projecting from the valve block at the other end of the hollow piston rod, said second stem being screwed into the hollow end of the first stem.

11. A hydraulic vibration damper according to claim 4, wherein the spring-loaded piston surrounds the stem projecting inwardly from an end closure member for the hollow piston rod, a stop being provided on said stem to limit the movement of the spring-loaded piston away from the end closure member, whereby piston, end closure and springs are retained together as a single unit when removed from the vibration damper.

12. A hydraulic vibration damper comprising a cylinder, a piston movable in the cylinder and dividing the said cylinder into two chambers, a rod carrying the piston, a chamber within said rod forming a reservoir, and oppositely acting flow restricting pressure responsive means resisting the flow of liquid out of each of said cylinder chambers, each of said flow restricting means being located to control liquid flow between one of said cylinder spaces and said reservoir.

13. A hydraulic vibration damper comprising a floating piston and cylinder unit with means for permitting a restricted flow of liquid past the piston, characterized by the feature that the piston is mounted on a rod at least a part of which is hollow and forms a reservoir for liquid which communicates with the chambers formed on opposite sides of said piston, means including a spring-loaded piston in the reservoir adapted to exert pressure on the liquid therein, and an indicator device associated with the piston which shall be visible externally of the vibration damper for indicating the position of the floating piston.

JOHN KEITH SIMPSON.